(12) United States Patent
Kalaboukis et al.

(10) Patent No.: US 11,734,656 B1
(45) Date of Patent: Aug. 22, 2023

(54) DISTRIBUTED DEVICE RATING SYSTEM

(71) Applicant: Wells Fargo Bank, N.A., San Francisco, CA (US)

(72) Inventors: Chris Theodore Kalaboukis, San Jose, CA (US); Rameshchandra Bhaskar Ketharaju, Hyderabad (IN); Joon Maeng, Newcastle, WA (US); Ramanathan Ramanathan, Bellevue, WA (US); Abhijit Rao, Irvine, CA (US); Andres J. Saenz, Cape Coral, FL (US); Makarand Shivadevuni, San Ramon, CA (US); Joel Eric Boeder, Maple Grove, MN (US)

(73) Assignee: Wells Fargo Bank N.A., San Francisco, CA (US)

( * ) Notice: Subject to any disclaimer, the term of this patent is extended or adjusted under 35 U.S.C. 154(b) by 113 days.

(21) Appl. No.: 16/723,067

(22) Filed: Dec. 20, 2019

(51) Int. Cl.
G06Q 20/08 (2012.01)
G06Q 20/40 (2012.01)

(52) U.S. Cl.
CPC ............... *G06Q 20/085* (2013.01); *G06Q 20/401* (2013.01)

(58) Field of Classification Search
None
See application file for complete search history.

(56) References Cited

U.S. PATENT DOCUMENTS 7,941,267 B2 5/2011 Adamczyk et al.
8,655,762 B2 2/2014 Abifaker
10,038,700 B1\* 7/2018 Duchin et al. ....... H04L 63/102
10,237,290 B2 3/2019 Balakrishnan et al.
10,326,766 B2 6/2019 Egner et al.
10,338,913 B2 7/2019 Franchitti (Continued)

FOREIGN PATENT DOCUMENTS

CN 108694518 A 10/2018
CN 109191275 A 1/2019

(Continued)

OTHER PUBLICATIONS

Notice of Allowance from U.S. Appl. No. 16/900,151, dated Oct. 14, 2021, 8 pp.

(Continued)

*Primary Examiner* — Chrystina E Zelaskiewicz
(74) *Attorney, Agent, or Firm* — Shumaker & Sieffert, P.A.

(57) ABSTRACT

A distributed device rating system includes a device that is configured to send, to a central authority system, a query to identify at least one other device with which to perform a transaction, where the query specifies one or more criteria associated with the transaction, receive, from the central authority system, an identification of one or more candidate devices with which to perform the transaction, receive rating information associated with the one or more candidate devices, where the rating information identifies at least one characteristic of services previously performed by the one or more candidate devices, determine whether the rating information associated with at least one candidate device of the one or more candidate devices satisfies a rating threshold, and, responsive to determining that the rating information satisfies the rating threshold, initiate, with the at least one candidate device, performance of the transaction.

19 Claims, 6 Drawing Sheets

(56) References Cited

U.S. PATENT DOCUMENTS

| | | | |
|---|---|---|---|
| 10,524,268 | B2 | 12/2019 | Ogrinz |
| 11,138,657 | B1 | 10/2021 | Boeder et al. |
| 11,308,552 | B1 | 4/2022 | Boeder et al. |
| 2006/0224502 | A1 | 10/2006 | McGowan |
| 2008/0052224 | A1 | 2/2008 | Parker |
| 2008/0103970 | A1 | 5/2008 | Books et al. |
| 2008/0156868 | A1 | 7/2008 | Slen et al. |
| 2009/0076972 | A1 | 3/2009 | Witchel et al. |
| 2009/0287605 | A1 | 11/2009 | Galit et al. |
| 2010/0057609 | A1 | 3/2010 | Sibson |
| 2011/0178899 | A1 | 7/2011 | Huszar |
| 2011/0246306 | A1* | 10/2011 | Blackhurst et al.   G06Q 30/0261 705/14.66 |
| 2012/0265681 | A1 | 10/2012 | Ross |
| 2013/0117174 | A1 | 5/2013 | Cole et al. |
| 2013/0218675 | A1 | 8/2013 | Choi |
| 2014/0067650 | A1 | 3/2014 | Gardiner et al. |
| 2014/0074701 | A1 | 3/2014 | Kingston et al. |
| 2014/0122340 | A1 | 5/2014 | Flitcroft et al. |
| 2015/0066739 | A1 | 3/2015 | Lucas, Jr. et al. |
| 2015/0073929 | A1* | 3/2015 | Psota .............. G06Q 30/0605 705/26.2 |
| 2015/0310470 | A1 | 10/2015 | Mathew et al. |
| 2016/0267584 | A1 | 9/2016 | Nair |
| 2017/0011324 | A1 | 1/2017 | Truong et al. |
| 2017/0061535 | A1 | 3/2017 | Williams |
| 2017/0068792 | A1 | 3/2017 | Reiner |
| 2017/0169497 | A1* | 6/2017 | Lee et al. ........... G06Q 30/0631 |
| 2018/0039970 | A1 | 2/2018 | Gorenstein |
| 2018/0089605 | A1 | 3/2018 | Poornachandran et al. |
| 2018/0137593 | A1 | 5/2018 | Djuric et al. |
| 2018/0164785 | A1 | 6/2018 | Frederick et al. |
| 2018/0308134 | A1* | 10/2018 | Manning et al. ...... G06Q 30/08 |
| 2019/0020657 | A1* | 1/2019 | Egner et al. ......... H04W 12/009 |
| 2019/0026716 | A1 | 1/2019 | Anbukkarasu et al. |
| 2019/0034924 | A1 | 1/2019 | Prabhu et al. |
| 2019/0081789 | A1 | 3/2019 | Madisetti et al. |
| 2019/0197430 | A1 | 6/2019 | Arditi |
| 2019/0295064 | A1 | 9/2019 | Malo |
| 2020/0051058 | A1 | 2/2020 | Nandakumar et al. |
| 2020/0082394 | A1* | 3/2020 | Jain et al. ............. G06Q 20/385 |
| 2020/0184555 | A1 | 6/2020 | Gleizer |
| 2020/0265511 | A1 | 8/2020 | Silveira et al. |
| 2020/0311808 | A1 | 10/2020 | Srivastava et al. |
| 2021/0142397 | A1* | 5/2021 | Soundararajan et al. ................... G06Q 20/18 |

FOREIGN PATENT DOCUMENTS

| | | | |
|---|---|---|---|
| CN | 109472596 | A | 3/2019 |
| CN | 109492774 | A | 3/2019 |
| KR | 101802771 | B1 | 11/2017 |
| KR | 101995871 | B1 | 7/2019 |

OTHER PUBLICATIONS

Campana et al., "A machine-learned ranking algorithm for dynamic and personalized car pooling services," Nov. 2016, 7 pages.

Lane et al., "Lowering Financial Inclusion Barriers With a Blockchain-Based Capital Transfer System," Whitepaper Version 1.1, 2017, 28 pp. (Applicant points out, in accordance with MPEP 609.04(a), that the year of publication, 2017, is sufficiently earlier than the effective U.S. filing date, so that the particular month of publication is not in issue.).

M. Tian, L. Wang, S. Yan, X. Tian, Z. Liu and J. J. P. C. Rodrigues, "Research on Financial Technology Innovation and Application Based on 5G Network," in IEEE Access, vol. 7, pp. 138614-138623, Aug. 2019, doi: 10.11 09/ Access.2019.2936860 (Year: 2019).

Notice of Allowance from U.S. Appl. No. 16/900,151, mailed Jun. 16, 2021, 10 pp.

Rajasingham, "Welcome to the machine-to-machine economy," CAN, accessed from https://www.commbank.com.au/guidance/newsroom/corporate-travel1-201711.html, published online Nov. 28, 2017, 8 pp.

Shala et al., "Novel trust consensus protocol and blockchain-based trust evaluation system for M2M application services," Internet of Things 7 (2019), Elsevier, accepted May 10, 2019, 25 pp.

Srinidhi et al., "Network optimizations in the Internet of Things: A review," International Journal of Engineering Science and Technology 22 (2019), Elsevier, accepted Sep. 9, 2018, 21 pp.

Strugar et al., "An architecture for distributed ledger-based M2M auditing for Electric Autonomous Vehicles," Workshops of the International Conference on Advanced Information Networking and Applications, Mar. 15, 2019, accessed from SpringLink, arXiv:1804.00658v2, 12 pp.

Wang, "Optimizing ride matches for dynamic ride-sharing systems," Thesis, Doctor of Philosophy in the School of Industrial and Systems Engineering, Georgia Institute of Technology. Retrieved from https=//smartech_gatech.edu/bitstream/handle/1853/47668/wang_xing_201305_phd.pdf, May 2013, 125 pages.

Yang et al., "New Loan System Based on Smart Contract," ACM International Symposium on Blockchain and Secure Critical Infrastructure (BSCI '19), Jul. 8, 2019, 6 pp.

RUIZ, "How to add support for gift cards on your Ethereum-based dapps," Dec. 28, 2017, 6 pp.

* cited by examiner

DISTRIBUTED DEVICE RATING SYSTEM

TECHNICAL FIELD

The present disclosure relates to distributed computing systems.

BACKGROUND

In many instances, devices such as machines may interact with each other within a distributed system. For example, a first device associated with a user may be configured to engage in a transaction with a second device to purchase a product (e.g., a physical or virtual product). In these cases, before engaging in the transaction, the user of the first device may access a user-based rating system to try and assess the trustworthiness of the second device. For example, a user-based rating system may capture previously provided ratings (e.g., one to five starts) that have been manually input by other users who have previously engaged in similar transactions. Existing rating systems typically require manual input from one or more users to capture these types of ratings.

SUMMARY

In general, this disclosure describes techniques for implementing a distributed device rating system that enables a first device (e.g., first machine) to receive ratings (e.g., real-time ratings) to verify, for example, the capabilities and/or trustworthiness of a second device (e.g., second machine) prior to using the second device in performing a transaction. In various examples, the distributed rating system may enable autonomous device-to-device (e.g., machine-to-machine) transactions that do not involve user or human intervention. The distributed rating system may include a central trusted authority system and various devices that are communicatively coupled to the central system. The central system may include a central repository or registry that stores identification data, capability data, and/or ratings data for devices that have been involved in transactions within a network. A device may receive ratings associated with one or more other candidate devices in the system, and may determine, based on the ratings, whether to use one of the candidate devices in performing a transaction. In some cases, in order to obtain these ratings, the device may send rating queries to other devices in the system that have previously used or interacted with one or more of the candidate devices.

As one example, this disclosure is directed to a method that includes sending, by a device and to a central authority system, a query to identify at least one other device with which to perform a transaction, wherein the query specifies one or more criteria associated with the transaction, and, responsive to sending the query, receiving, by the device and from the central authority system, an identification of one or more candidate devices with which to perform the transaction. This example method further includes receiving, by the device, rating information associated with the one or more candidate devices, wherein the rating information identifies at least one characteristic of services previously performed by the one or more candidate devices, determining, by the device, whether the rating information associated with at least one candidate device of the one or more candidate devices satisfies a rating threshold, and, responsive to determining that the rating information associated with the at least one candidate device of the one or more candidate devices satisfies the rating threshold, initiating, by the device and with the at least one candidate device, performance of the transaction.

As another example, this disclosure is directed to a device that includes one or more processors and a computer-readable storage device. The computer-readable storage device stores instructions that are executed by the one or more processors to: send, to a central authority system, a query to identify at least one other device with which to perform a transaction, wherein the query specifies one or more criteria associated with the transaction; responsive to sending the query, receive, from the central authority system, an identification of one or more candidate devices with which to perform the transaction; receive rating information associated with the one or more candidate devices, wherein the rating information identifies at least one characteristic of services previously performed by the one or more candidate devices; determine whether the rating information associated with at least one candidate device of the one or more candidate devices satisfies a rating threshold; and responsive to determining that the rating information associated with the at least one candidate device of the one or more candidate devices satisfies the rating threshold, initiate, with the at least one candidate device, performance of the transaction.

As another example, this disclosure is directed to a computer-readable storage medium storing instructions that, when executed, cause one or more processors of a device to: send, to a central authority system, a query to identify at least one other device with which to perform a transaction, wherein the query specifies one or more criteria associated with the transaction; responsive to sending the query, receive, from the central authority system, an identification of one or more candidate devices with which to perform the transaction; receive rating information associated with the one or more candidate devices, wherein the rating information identifies at least one characteristic of services previously performed by the one or more candidate devices; determine whether the rating information associated with at least one candidate device of the one or more candidate devices satisfies a rating threshold; and responsive to determining that the rating information associated with the at least one candidate device of the one or more candidate devices satisfies the rating threshold, initiate, with the at least one candidate device, performance of the transaction.

As another example, this disclosure is directed to a system that includes a central authority system comprising first one or more processors and at least one first computer-readable storage device storing first instructions, and a device comprising second one or more processors and at least one second computer-readable storage device storing second instructions. The first instructions stored by the at least one first computer-readable storage device are executable by the first one or more processors of the central authority system to: receive, from the device, a query to identify at least one other device with which to perform a transaction, wherein the query specifies one or more criteria associated with the transaction; and, responsive to receiving the query, send, to the device, an identification of one or more candidate devices with which to perform the transaction. The second instructions stored by the at least one second computer-readable storage device are executable by the second one or more processors of the device to: responsive to sending the query to the central authority system, receive, from the central authority system, the identification of the one or more candidate devices; receive rating information associated with the one or more candidate devices, wherein the rating information identifies at least one characteristic of services previously performed by the one or more candidate devices;

determine whether the rating information associated with at least one candidate device of the one or more candidate devices satisfies a rating threshold; and, responsive to determining that the rating information associated with the at least one candidate device of the one or more candidate devices satisfies the rating threshold, initiate, with the at least one candidate device, performance of the transaction.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
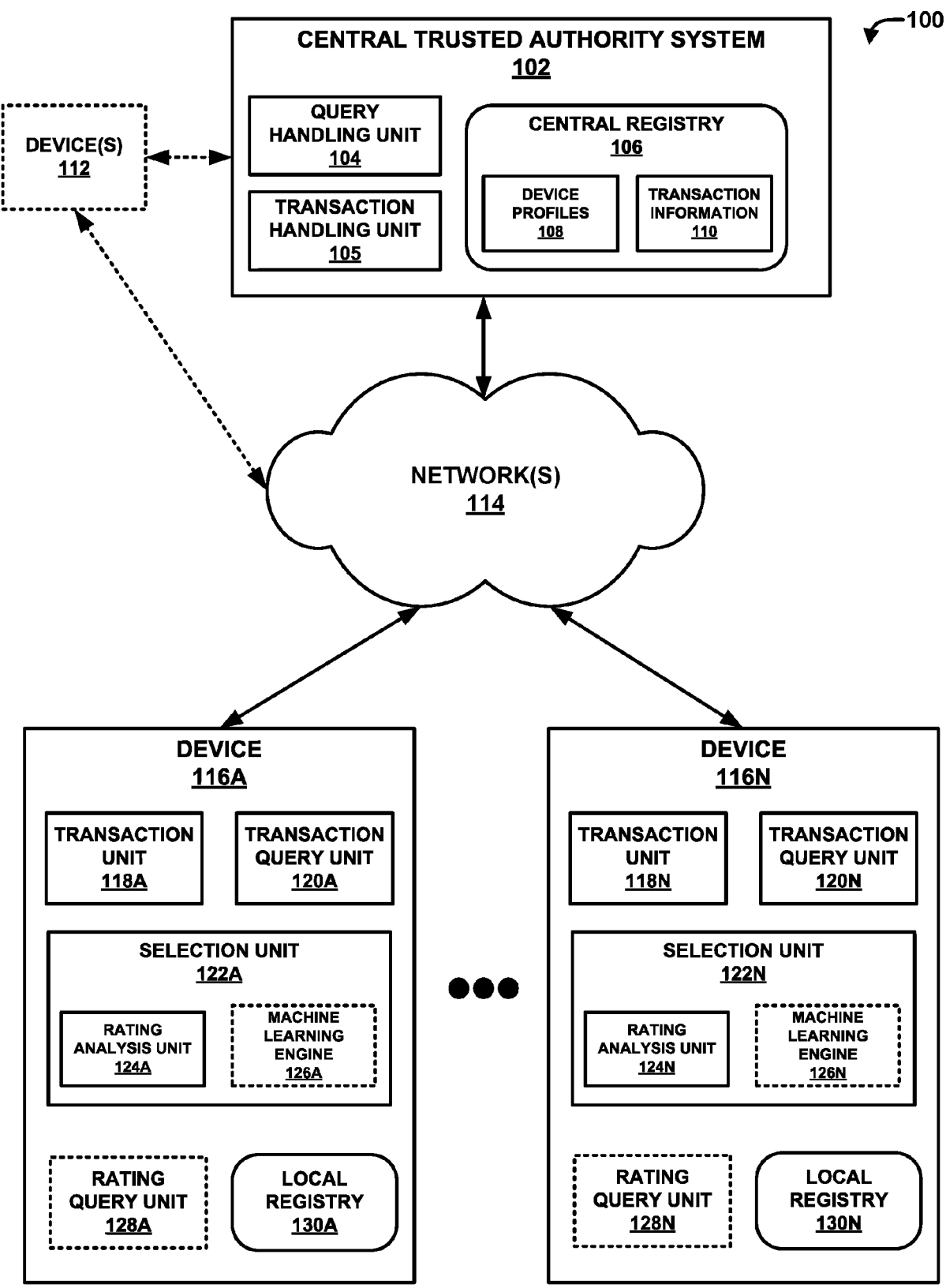
FIG. 1 is a block diagram illustrating an example distributed device rating system that is configured to provide rating information associated with one or more devices in the system, in accordance with techniques of this disclosure.

For device-to-device (e.g., machine-to-machine) transactions, it may often be beneficial for a first device to verify the capabilities and/or trustworthiness of a second device prior to using the second device to perform a transaction. For example, a first device associated with a user may be configured to engage in a transaction with a second device to purchase a widget (e.g., a physical or virtual widget). One way of gauging the capabilities and/or trustworthiness of the second device is through the use of a rating system, which may provide ratings of the second device based upon prior transactions with the second device. Existing rating systems often use ratings provided by humans, which are subjective and static. Since devices such as machines may often change owners or, in the case of virtual machines, be torn down and later re-instantiated, static ratings of the second device may often not be accurate.

In general, this disclosure describes techniques for implementing a distributed device rating system that enables a first device (e.g., first machine) to receive ratings (e.g., real-time ratings) to verify, for example, the capabilities and/or trustworthiness of a second device (e.g., second machine) prior to using the second device in performing a transaction. The distributed rating system may include a central trusted authority system and various devices that are communicatively coupled to the central system. The central system may include a central repository or registry that stores identification data, capability data, and/or ratings date for devices that have been involved in transactions within a network. A device may receive real-time ratings associated with one or more other candidate devices in the system, and may determine, based on the real-time ratings, whether to use one of the candidate devices in performing a transaction. In some cases, in order to obtain these real-time ratings, the device or a test device associated with the central system may send rating queries to other devices in the system that have previously used or interacted with one or more of the candidate devices. For example, a requesting device (e.g., the first device or the test device) may request real-time ratings for the second device from other devices within the network and calculate a composite rating for the second device. The first device may determine whether the composite rating satisfies a particular threshold in determining whether to use the second device to perform the transaction.

In various examples, the central system may, in response to receiving a query from the first device, be configured to identify a group of candidate devices that are capable of performing a requested transaction. The trusted system may further identify other devices in the network that have previously used one or more of the candidate devices. Either the first device or the test device associated with the central system may then send queries to these other devices to request ratings of the candidate devices. The first device may then calculate composite ratings of the candidate devices and select one of these candidate devices for the requested transaction based on a comparison of the composite ratings to one another and/or to one or more rating thresholds.

In various examples, a device (e.g., machine) may comprise a physical entity (e.g., a computing device, a computer server, a quantum computer, a desktop computer, a tablet computer, a laptop computer, any mechanical device with computing engine such as a self-driving automobile, drone, parking meter, highway toll, sensor with computing engine such as Internet of Things, smartphone, etc.) and/or virtual entity (e.g., virtual machine, application software in a computing machine, cloud computing system, etc.). In certain examples, a device (e.g., machine) may include one or more computers that process information, sensors that monitor performance and movement, and/or devices with embedded computers such as smartphones, television sets, radios, wireless headsets, digital cameras, global positioning system (GPS) based navigators, automated teller machines, drones, traffic lights, battery chargers, parking meters, and so on. Some devices conduct a single function and others carry out multiple functions.

FIG. 1 is a block diagram illustrating an example distributed device rating system 100 that is configured to provide rating information associated with one or more devices in system 100, in accordance with techniques of this disclosure. As shown in FIG. 1, distributed system 100 includes a central trusted authority system 102 and one or more devices (e.g., machines) 112 that are included in or otherwise communicatively coupled to central trusted authority system 102. Distributed system 100 also includes devices 116A-116N (collectively, "devices 116") that are communicatively coupled to central trusted authority system 102 and devices 112 via one or more networks 114. Networks 114 may comprise one or more wired and/or wireless communication networks, such that central trusted authority system 102, devices 112, and devices 116 may communicate with one another via one or more wired and/or wireless connections. Central trusted authority system 102, devices 112, and devices 116 may be physically located at one geographical location or may be distributed among different geographical locations.

As will be described in further detail below, one of devices 116 (e.g., device 116A) may send, to central authority system 102, a query to identify at least one other device from devices 116 with which to perform a transaction (e.g., 602 shown in FIG. 6). The query may specify one or more criteria associated with the transaction (e.g., type of service to be performed, preferred cost and/or timeframe of service, preferred communication protocols, preferred operating systems). In response to the query, device 116A may receive, from central authority system 102, an identification of one or more candidate devices from devices 116 with which to perform the transaction (e.g., 604 shown in FIG. 6). Device 116A may then communicate with one or more other devices 116, which may be referred to as reference devices, to obtain rating information associated with the candidate devices. Central authority system 102 may, in various examples, provide device 116A with the identifiers of such reference devices 116, as described in further detail below.

Figure 6:
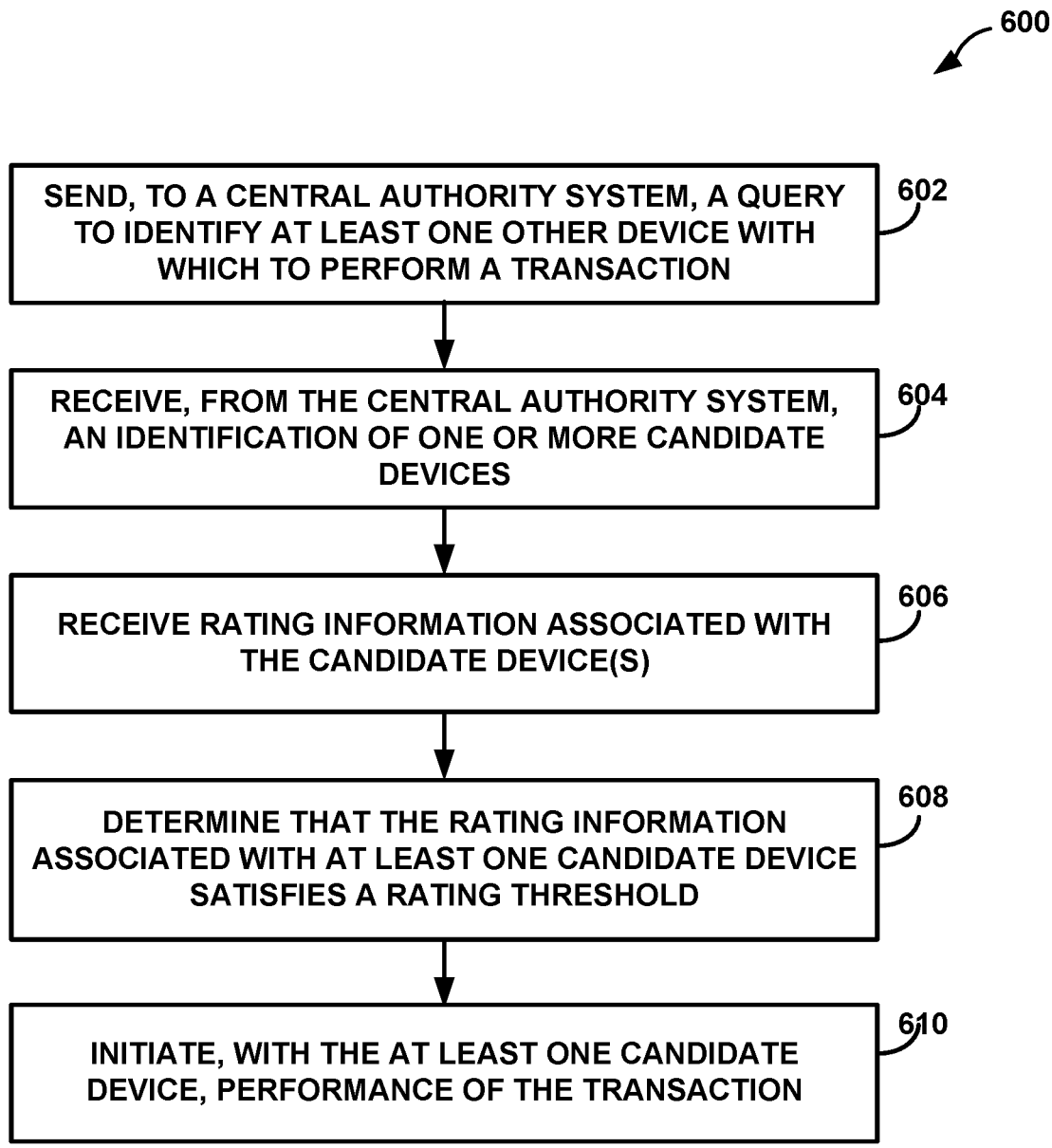
FIG. 6 is a flow diagram illustrating example operations to provide rating information associated with one or more devices in a distributed device rating system, in accordance with techniques of this disclosure.

Device 116A may receive real-time rating information associated with these candidate devices, where the real-time rating information identifies at least one characteristic of services previously performed by the candidate devices (e.g., 606 shown in FIG. 6). Device 116A may receive such rating information from one or more reference devices 116 with which it communicates and/or from central authority system 102. The characteristics may be or provide indications of services that are performed by the candidate devices, capabilities of the candidate devices to perform requested services, cost or timing characteristics associated with performed services, operating systems or communication protocols used by the candidate devices, quality of services provided, and/or trustworthiness of the candidate devices.

Device 116A may determine that the real-time rating information satisfies a respective rating threshold associated with at least one candidate device (e.g., 608 shown in FIG. 6). Device 116A may then select and/or initiate performance of the transaction with at least one of the candidate devices (e.g., 610 shown in FIG. 6) based on the real-time rating information (e.g., based on whether the real-time rating information satisfies a respective rating threshold associated with at least one candidate device). In some cases, device 116A may determine whether the real-time rating information associated with one or more candidate devices satisfies a respective rating threshold associated at least one candidate device by determining whether the at least one characteristic of previously performed services satisfies at least one criterion of a respective rating threshold for at least one candidate device. For example, this at least one criterion may be related to factors related to capabilities of a candidate device to perform requested services, cost or timing characteristics associated with performed services, operating systems or communication protocols used by the candidate device, quality of services provided, and/or trustworthiness of the candidate device.

As shown in FIG. 1, central authority system 102 includes a query handling unit 104, a transaction handling unit 105, and a central registry 106. Query handling unit 104 is configured to receive and process queries that are received from any of devices 112, 116. Transaction handling unit 105 is configured to process transaction information based on transactions that occur within system 100. Central registry 106 of central authority system 102 includes device profiles 108 and transaction information 110. Transaction information 110 may include information associated with transactions that are or have been performed within system 100, such as between devices 116 and/or with central authority system 102. This information may include specific information for each individual transaction, such as the type of transaction, metadata associated with the transaction, and any identifiers (e.g., machine identifiers) of devices that were involved in the respective transaction. Transaction information 110 may be populated and updated based upon information collected and/or provided by transaction handling unit 105. In various examples, transaction handling unit 105 is capable of monitoring transactions that occur within system 100. In certain cases, transaction handling unit 105 is configured to populate and update transaction information 110 based upon direct involvement of central authority system 102 in certain transactions that occur between devices 116 and/or with central authority system 102. In some cases, transaction handling unit 105 is configured to populate and update transaction information 110 based upon transaction data it receives from one or more of devices 116 (e.g., transaction data provided by one or more of devices 116 based on transactions that occur between these devices).

Device profiles 108 includes information for each device in system 100, such as devices 112, 116. Each individual device profile within device profiles 108 may include information associated with a respective device. For instance, each device profile may include identification data (e.g., a unique identifier), capability data, and/or rating data for each respective device. Central authority system 102 may populate and/or update the information contained in device profiles based upon information received by query handling unit 104 and/or transaction handling unit 105 from one or more of devices 116. In some cases, central authority system 102 may determine or assign certain information contained in device profiles 108. For example, in some cases, central authority system 102 may be configured to define and/or assign unique identifiers for each of devices 116 in system 100, and store these within the respective device profiles for each of devices 116.

In the case of a physical device, the unique identifier for the device may, in some cases, be the device's Internet Protocol (IP) or media access control (MAC) address. In the case of a virtual device (e.g., virtual machine), the unique identifier may be an identifier associated with or assigned by the physical device on which the virtual device is executed. In some examples, the identifiers of all the devices, whether physical or virtual, are assigned by central authority system 102, which may ensure that all currently active devices have a unique identifier within device profiles 108. In addition, central authority system 102 may periodically refresh the identifiers to remove identifiers of devices that are no longer available and assign new identifiers to newly available machines. In this way, central authority system 102, as opposed to individual devices with system 100, manages the identification of any virtual devices (e.g., virtual machines), which may be torn down and re-instantiated over time. At the time these identifiers are refreshed, central authority system 102 may also establish or re-establish trustworthiness of the devices based upon the rating information stored in, or gathered for storage in, device profiles 108. In certain cases, central trusted authority system 102 may utilize associated devices 112, which are either part of or communicatively coupled to central authority system 102, to establish or re-establish the trustworthiness of devices having information stored in device profiles 108, as described in further detail below.

In one particular example, device profiles 108 may include a device profile for device 116A, which may include unique identification data (e.g., a unique alphanumeric or binary identifier) for device 116A, as well as capability data and rating data for device 116A. The capability data may include, e.g., data indicating any capabilities or services provided by device 116A, costs associated with such services, communication protocols used by device 116A in communicating with other entities in system 100, and/or the operating system(s) utilized by device 116A. As will be described in further detail below, the rating data may include similar and/or supplemental data associated with device 116A based upon feedback or rating information received by central authority system 102 from other ones of devices 116, in view of prior transactions that have been conducted between these devices and device 116A. For instance, the rating data may provide, e.g., indications of services that are performed by device 116A, capabilities of device 116A to perform requested services, cost or timing characteristics associated with performed services, operating systems or communication protocols used by device 116A, quality of services provided, and/or trustworthiness of device 116A. In some cases, central authority system 102 may perform a trustworthiness determination for each of devices 116 in system, such that only those devices on a trust list or whitelist are included in device profiles 108 that are accessible by other devices in system 100.

Based upon transactions that occur within system 100, transaction handling unit 105 is capable of collecting rating data from one or more of devices 116 associated with these transactions, and storing this rating data within device profiles 108. For instance, if a given transaction occurs between device 116A and 116N, device 116N (or a user associated with device 116N) may provide a rating of device 116A (or a user associated with device 116A) for this transaction. As an example, device 116N may (e.g., using transaction unit 118N as described further below) provide rating feedback to transaction handling unit 105 indicating that device 116A provided a certain type of service for the transaction, which was delivered in a timely fashion, with reasonable cost, and with a high level of quality. Central authority system 102 may store the identifiers of devices 116A and 116N and/or other information associated with this transaction in transaction information 110, and may store the rating data for device 116A within the specific profile of device profiles 108 that corresponds to device 116A.

Each of devices 116 includes a transaction unit, a transaction query unit, a selection unit, and a local registry. In some cases, each of devices 116 also includes a rating query unit. For instance, as shown in FIG. 1, device 116A includes a transaction unit 118A, a transaction query unit 120A, a selection unit 122A, a local registry 130A, and an optional rating query unit 128A. Similarly, device 116N includes a transaction unit 118N, a transaction query unit 120N, a selection unit 122N, a local registry 130N, and an optional rating query unit 128N, which perform similar functions to the corresponding entities of device 116A.

Transaction unit 118A of device 116A is configured to initiate and/or otherwise process transactions between device 116A and one or more other entities, such as with other devices 116 and/or with central authority system 102. Transaction unit 118A may communicate with corresponding transaction units of other devices (e.g., transaction unit 118N of device 116N), and may in some cases also communicate with transaction handling unit 105 of central authority system 102, such as when device 116A performs transactions that may involve central authority system 102, or when device 116A sends transaction data associated with one or more other devices 116 to central authority system 102.

Transaction query unit 120A is configured to send queries to query handling unit 104 of central authority system 102 and receive identifications of other devices 116 with which to perform a transaction. The queries provided by transaction query unit 118A may specify one or more criteria associated with a desired transaction (e.g., type of service to be performed, preferred cost and/or timeframe of service, preferred communication protocols, preferred operating systems). In response to these queries, transaction query unit 120A may receive, from query handling unit 104, an identification of one or more candidate devices from devices 116 with which to perform desired transactions.

In various cases, query handling unit 104 of central authority system 102 may identify these candidate devices based upon information included in device profiles 108. As noted above, device profiles 108 may include identification data, capability data and/or rating data associated with each device in system 100. Query handling unit 104 may determine which capability data and/or rating data within device profiles 108 satisfies the criteria specified in the queries received from transaction query unit 120A (e.g., based on the type of service to be performed, preferred cost and/or timeframe of service, preferred communication protocols, preferred operating systems, etc.) For any capability and/or rating data that satisfies the specified criteria, query handling unit 104 may obtain the device identification data from device profiles 108 that correspond to this matching capability and/or rating data, and send this identification data to transaction query unit 120A. For instance, if query handling unit 104 determines that the capability and/or rating data associated with devices 116M and 116N, as stored in device profiles 108, satisfied the specified criteria, query handling unit 104 may obtain the device identifiers of devices 116M and 116N from device profiles 108, and send these identifiers, associated with candidate devices 116M and 116N, to transaction query unit 120A.

Device 116A may also receive real-time rating information associated with these candidate devices, where the real-time rating information identifies at least one characteristic of services previously performed by the candidate devices. These characteristics may be or provide indications of services that are performed by the candidate devices, capabilities of the candidate devices to perform requested services, cost or timing characteristics associated with performed services, operating systems or communication protocols used by the candidate devices, quality of services provided, and/or trustworthiness of the candidate devices. Device 116A may store any received real-time rating information in its local registry 130A.

In some cases, transaction query unit 120A may receive real-time rating information from query handling unit 104 of central authority system 102 in response to its queries. In these cases, query handling unit 104 may obtain any stored real-time rating information from device profiles 108 in its central registry 106. As described previously, transaction query unit 120A may receive, from query handling unit 104, an identification of one or more candidate devices from devices 116 with which to perform desired transactions. Query handling unit 104 of central authority system 102 may obtain any real-time rating information for these candidate devices from their respective profiles within device profiles 108, and may provide such real-time rating information for these candidate devices back to transaction query unit 120A, along with the identification data and/or capability data for these candidate devices.

In other cases, however, device 116A may send real-time queries to other ones of devices 116 within system 100 that may have previously performed transactions with these candidate devices. In these cases, transaction query unit 120A may also receive, from query handling unit 104, an identification of other devices 116 that have recently used the candidate machines for the same or similar types of transactions. In response to receiving a query from transaction query unit 120A, query handling unit 104 may not only identify the identifiers of candidate devices, but may further identify the identifiers of any other ones of devices 116 that have interacted with these candidate devices based upon data contained in transaction information 110. These ones of devices 116 may be referred to as reference devices.

For example, if query handling unit 104 identifies devices 116M and 116N as candidate devices with which requesting device 116A may perform a transaction, based on criteria included in the query sent by transaction query unit 120A, query handling unit 104 may access transaction information 110 stored in central registry 106 to identify any other devices that have previously interacted with devices 116M and/or 116N. Because transaction information 110 includes transaction details and device identifiers of any devices involved in particular transactions, query handling unit 104 is capable of obtaining the identifiers of reference devices that have previously interacted with devices 116M and/or 116N in one or more transactions (e.g., the same or similar types of transactions within which requesting device 116A wants to perform). Query handling unit 104 may then provide not only the identifier of candidate devices 116M and 116N to transaction query unit 120A, but may also provide the identifiers of these reference devices that have previously interacted with devices 116M and 116N.

Device 116A may then utilize, in certain examples, a rating query unit 128A to send, to these reference devices, queries for real-time rating information associated with candidate devices 116M and 116N. Rating query unit 128A uses the unique identifiers of these reference devices to send these rating queries to request the real-time ratings of candidate devices 116M and 116N. For example, if transaction query unit 120A receives the identifiers of reference devices 116B and 116C from query handling unit 104 of central authority system 102, rating query unit 128A may send individual queries to reference devices 116B and 116C (e.g., to respective rating query units 128B, 128C of these devices) to obtain any real-time rating information associated with candidate devices 116M and/or 116N, based on previous similar transactions that devices 116B and/or 116C may have performed with candidate devices 116M and/or 116N. The rating requests may be customized to gather ratings focused on specific, relevant factors or characteristics (e.g., factors/characteristics focused on the cost/quality/timeliness of the service performed or on the trustworthiness of candidate devices 116M and/or 116N). The real-time rating information provided by devices 116B and/or 116C may include information for one or more of these factors or characteristics, in conjunction with the unique identifier of the corresponding candidate device (e.g., identifier of candidate device 116M or 116N) for which the real-time rating information pertains. In some cases, device 116A may store this real-time rating information within its own local registry 130A, which may include device profile information for other devices in system 100, similar to device profiles 108 in central registry 106.

In various examples, system 100 may provide real-time security assessments to establish and/or verify that one or more of devices 116 are real and up to date. Upon determining that identified devices 116 pass these real-time security assessments, central authority system 102 may allow communications with or between these devices. However, if one or more of devices 116 do not pass the security assessment, central authority system 102 may determine that these devices 116 are not secure, and may refrain from providing any information to these devices. Central authority system 102 may also refrain from providing the identifiers of these unsecure devices to any other of devices 116 as either candidate or reference devices. Central authority system 102 may periodically perform the real-time security assessments of devices over time (e.g., on a periodic or scheduled basis).

In these examples, central authority system 102 may perform the real-time security assessments as follows. Central authority system 102 may first check the device time that is currently set or programmed on one or more of devices 116. Central authority system 102 may, in some cases, check the device time based on timestamps included in messages received by query handling unit 104 and/or transaction handling unit 105. For example, central authority system 102 may check the device time of device 116A based on timestamps included in messages sent from transaction query unit 120A to query handling unit 104, or based on timestamps included in messages sent from transaction unit 118A to transaction handling unit 105. In other cases, central authority system 102 may send individual request messages to devices 116 to receive device time information. For example, central authority system 102 may send such a request message to device 116N, and device 116N may send a response message that includes the current device time programmed on device 116N.

Upon receiving the device time from one or more of devices 116, central authority system 102 may compare these device times with the currently programmed system time on central authority system 102. If the device time of one or more of devices 116 is not within a defined threshold amount of the system time maintained on central authority system 102, central authority system 102 may raise a flag or exception, and may determine that these devices 116 are not currently secure. On the other hand, if the device time for one or more of devices 116 is within a defined threshold amount of the system time (e.g., the difference is less than the defined threshold amount), central authority system 102 may also compare the device times with universal standard time, and/or compare the difference between a respective device time and the system time with universal standard time, in order to identify potential time differences that may vary from location to location, such as a difference in time between the location of device 116A, 116N, and/or central authority system 102. If the determined difference is within a defined threshold amount, central authority system 102 may determine that the respective devices 116 are secure. As noted above, for any of devices 116 that do not pass the security assessment, central authority system 102 may determine that these devices 116 are not secure, and may refrain from providing any information to these devices, and/or refrain from providing the identifiers of these unsecure devices to any other of devices 116 as either candidate or reference devices.

In some examples, devices 112 (which, in some cases may be referred to as test devices associated with central authority system 102) include query units to query devices 116B and 116C to obtain real-time rating information associated with candidate devices 116M and 116N, and may store this real-time rating information in the respective profile information of device profiles 108 for candidate devise 116M and 116N. In this way, device profiles 108 may store a static rating of each device in addition to gathering real-time rating of each device via devices 112 immediately prior to use. In these examples, query handling unit 104 may provide the identifiers of devices 116B and 116C directly to devices 112, such that devices 112 (rather than device 116A) are configured to directly obtain real-time rating information from devices 116B and 116C. Query handling unit 104 may then provide this real-time rating information back to transaction query unit 120A for further processing. Transaction query unit 120A may store the rating information in local registry 130A.

Whether device 116A receives real-time rating information from devices 112, central authority system 102, or one or more of other devices 116, device 116A may then use the received real-time performance information associated with candidate devices 116M and 116N to select one of these devices to initiate performance of a desired transaction. For example, selection unit 122A of device 116A may select one of candidate devices 116M or 116N based on the real-time rating information associated with these devices, and then transaction unit 118A of device 116A may initiate performance of a transaction with the selected device. Transaction unit 118A may store transaction information (e.g., information similar to transaction information 110 of central registry 106) within its local registry 130A. For example, selection unit 122A may determine whether the rating information associated with the candidate devices satisfies a respective rating threshold associated with a respective candidate device, such as a predefined or dynamically determined threshold that is based on one or more factors (e.g., factors focused on the cost/quality/timeliness of the service performed or on the trustworthiness of candidate devices 116M and/or 116N). In some cases, the rating threshold may comprise a weighted threshold that is based on multiple different factors, where each factor has a particular weighted contribution to the overall weighted threshold. The weighting values associated with each factor may be predefined values or may be dynamically determined values that may change over time. In various examples, the respective rating threshold that is used may be different for each of devices 116, and these respective rating thresholds may be determined, configured, weighted, and/or adjusted based on factors that may be important to each respective device (e.g., speed/timeliness versus cost of service provided).

In some examples, selection unit 122A may select the candidate device based on a respective composite rating that is calculated for each of candidate devices 116M and 116N. Devices 112 and/or rating analysis unit 124A of selection unit 122A may calculate these composite ratings based on the received real-time rating information for candidate devices 116M and 116N that is received from devices 116B and 116C. Selection unit 122A may then use the composite ratings to select one of candidate devices 116M or 116N to perform the transaction.

For instance, rating query unit 128A may receive real-time rating information for candidate device 116M from both of devices 116B and 116C, and may provide this information to rating analysis unit 124A of selection unit 122A. Rating analysis unit 124A may then calculate a composite (e.g., mean average) rating for candidate device 116M based upon the individual ratings that were received from each of devices 116B and 116C. Similarly, rating query unit 128A may receive real-time rating information for candidate device 116N from both of devices 116B and 116C. Rating analysis unit 124A may calculate a composite rating for candidate device 116N based upon the individual ratings that were received from each of devices 116B and 116C.

Rating analysis unit 124A may then select the candidate device having the highest overall composite rating that satisfies a respective rating threshold (e.g., a predefined or dynamically determined threshold determined on one or more factors, such as described above) that is associated with that device. If, for instance, device 116M has the overall highest composite rating that satisfies a defined rating threshold, rating analysis unit 124A may select device 116M. Transaction unit 118A of device 116A may then initiate a transaction with the selected device 116M. In some examples, transaction unit 118A may also perform a test transaction with the selected device 116M prior to use by device 116A. The test transaction may determine whether selected device 116M functions as expected (e.g., charges the correct amount, actually delivers the requested service, has the capabilities advertised).

In some examples, one or more of the candidate devices may comprise a device chain, or chain of candidate devices. In these examples, a candidate device (e.g., a mobile phone) may include or be associated with one or more other candidate devices (e.g., an automobile), and this group of candidate devices may comprise a device chain. The real-time rating information may be associated with all of the candidate devices in the device chain, where each individual candidate device has its own unique identifier.

For instances in which device chains are used, central authority system 102 may send device 116A the identifier of each candidate device, as well an indication that the candidate devices are associated with a particular device chain (e.g., through the use of a chain identifier or other indication or relationship). When requesting real-time rating information from other devices 116 and/or from central authority system 102, device 116A may specify the identifiers of each candidate device, as well as the indication of these devices being associated with the same device chain. Device 116A may then receive real-time rating information that is associated with the collective group of candidate devices in this device chain (e.g., rating information associated with the combination of a mobile phone that is currently being used in a particular automobile).

In various cases, a registry (e.g., local registry 130A, central registry 106) may store device chain information and/or associations between devices. For example, device profiles 108 of central registry 106 may include the identification data of individual candidate devices, as well as identification or association data that groups candidate devices together into collective device chains (e.g., using device chain identifiers or other association identifiers). The rating data included in device profiles 108 may also include collective rating information that is associated with chains or groups of devices. Similarly, transaction information 110 may include transaction information that is associated with groups of chains of devices based on individual or chain/association identifiers.

In some examples, the requesting machine, such as device 116A, may gather a relatively small number of real-time ratings for a relatively small number of candidate devices with which to perform a transaction. In these examples, the requesting machine may calculate the composite rating as an average (e.g., mean) rating of the received real-time ratings for each of the candidate devices, and selection unit 122A (e.g., using rating analysis unit 124A) may select the one of the candidate devices (e.g., candidate device 116M) that has the highest average rating and that satisfied a respective rating threshold associated with that candidate device.

In other examples, the requesting device may gather a relatively large number of real-time ratings for a relatively large number of candidate devices with which to perform the transaction. In these examples, the requesting device may include a machine learning engine. For example, as shown in FIG. 1, device 116A may include a machine learning engine 126A that comprises an artificial intelligence (AI) or deep learning engine capable of analyzing a large number of real-time ratings for candidate devices to select the optimum candidate device for device 116A to use when performing the transaction.

Figure 2:
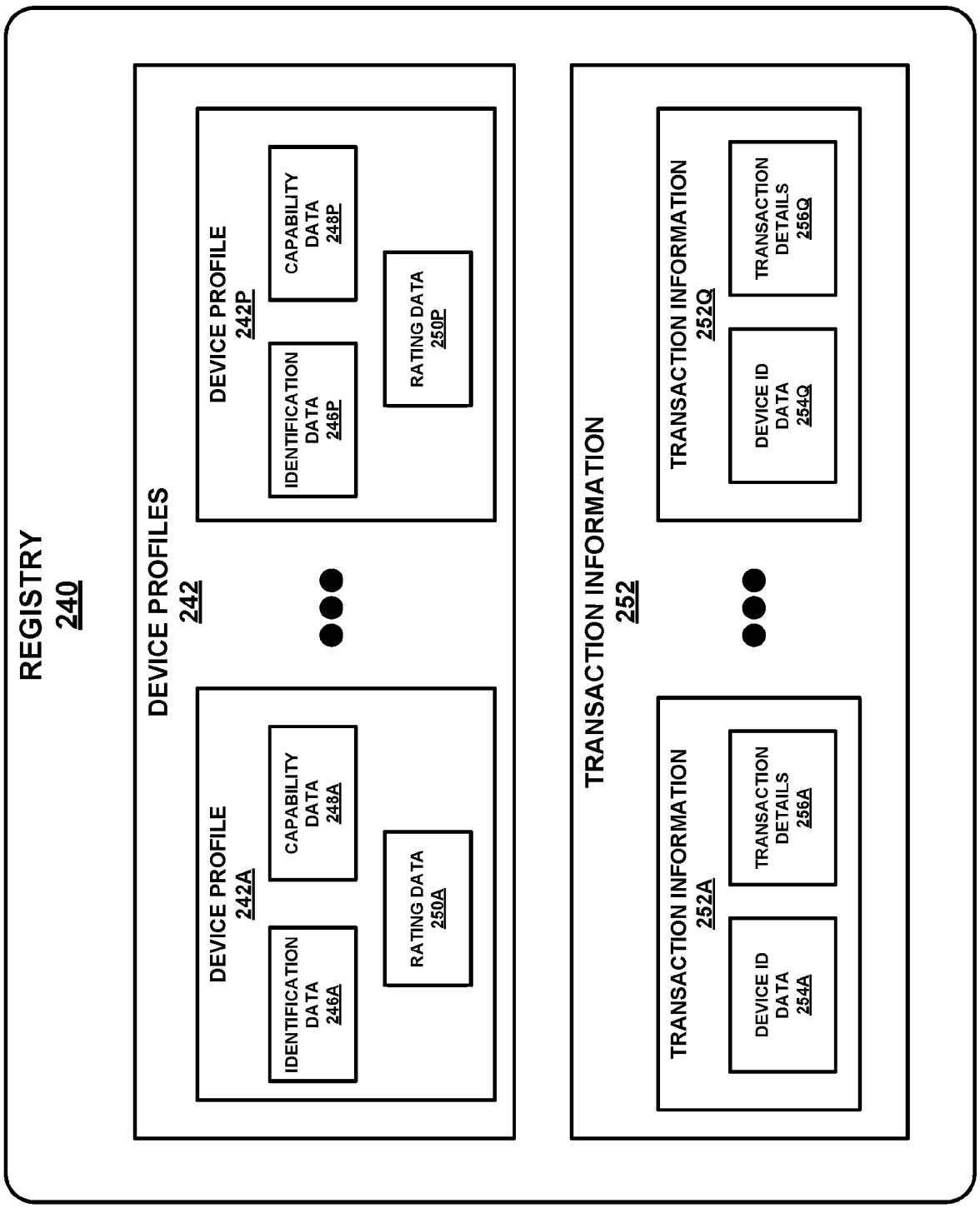
FIG. 2 is a block diagram illustrating further example details of one or more of the registries shown in FIG. 1, in accordance with techniques of this disclosure.

FIG. 2 is a block diagram illustrating further example details of one or more of the registries shown in FIG. 1, in accordance with techniques of this disclosure. FIG. 2 shows an example registry 240. Registry 240 may be one example of central registry 106 shown in FIG. 1. In some examples, registry 240 may also be one example of a local registry of one or more of devices 116, such as local registry 130A and/or local registry 130N shown in FIG. 1.

Registry 240 of FIG. 2 includes one or more device profiles 242A-242P (collectively, "device profiles 242") and transaction information 252A-252Q (collectively, "transaction information 252"). As illustrated in FIG. 2, each of device profiles 242 includes identification data, capability data, and rating data. For example, device profile 242A includes identification data 246A, capability data 248A, and rating data 250A. Similarly, device profile 242P includes identification data 246P, capability data 248P, and rating data 250P.

Each individual device profile within device profiles 242 may include information associated with a respective device. For instance, a first device profile (e.g., device profile 242A) may include information associated with a first device (e.g., device 116A in FIG. 1), while a second device profile (e.g., device profile 242B) may include information associated with a second device (e.g., device 116B).

In some cases, device profiles 242 may be one example of device profiles 108 stored in central registry 106 of central authority system 102 (FIG. 1), and transaction information 252 may be example of transaction information 110 stored in central registry 106. If device profile 242A includes information for device 116A shown in FIG. 1, identification data 246A may include a unique identifier that is assigned to device 116A. In certain examples, this unique identifier may comprise a unique alphanumeric string, a unique binary identifier, or another form of unique tag. As described previously in reference to FIG. 1, in the case of device 116A being a physical device, the unique identifier for device 116A may, in some cases, be the device's IP or MAC address. In the case of device 116A being a virtual device (e.g., virtual machine), the unique identifier of device 116A may be an identifier associated with or assigned by the physical device on which virtual device 116A is executed.

In some examples, the identifiers (e.g., identification data 246A, 246P) of all the devices, whether physical or virtual, are assigned by a central authority system (e.g., central authority system 102 of FIG. 1), which may ensure that all currently active devices have a unique identifier within device profiles 242. In addition, the central authority system may periodically refresh the identifiers to remove identifiers of devices that are no longer available and assign new identifiers to newly available machines. In this way, the central authority system manages the identification of any virtual devices (e.g., virtual machines), which may be torn down and re-instantiated over time.

Capability data 248A may include, e.g., data indicating any capabilities or services provided by device 116A, costs associated with such services, communication protocols used by device 116A in communicating with other entities in system 100 of FIG. 1, and/or the operating system(s) utilized by device 116A, to name only a few examples. In some cases, the central authority system (e.g., central authority system 102) may collect capability data 248A for storage in registry 240 based on information provided directly from the corresponding device, such as device 116A. In certain cases, the central authority system may also collect capability data 248A for device 116A from one or more other devices within the system, based upon these devices' prior interactions or transactions with device 116A.

Rating data 250A may, in some cases, include similar and/or supplemental data associated with device 116A based upon feedback or rating information received by the central authority system from other devices in the system, in view of prior transactions that have been conducted between these devices and device 116A. For instance, rating data 250A may provide, e.g., indications of services that are performed by device 116A, capabilities of device 116A perform requested services, cost or timing characteristics associated with performed services, operating systems or communication protocols used by device 116A, quality of services provided, and/or trustworthiness of device 116A.

In certain cases, a device included in or communicatively coupled to the central authority system, such as one or more of devices 112 shown in FIG. 1, may send queries to other devices in the system to obtain real-time rating information for a given device. For instance, devices 112 may send queries to certain ones of devices 116 to obtain real-time rating information for device 116A. The queried devices may be those that have previously interacted with device 116A for certain types of transactions in the past. Upon receiving the real-time rating information from these devices, the central authority system may store the received information in rating data 250A of device profile 242A that corresponds to device 116A. The central authority system may then provide rating data 250A to any of the devices within system 100 upon request.

In some cases, registry 240 may be an example of a local registry stored on a device, such as local registry 130A of device 116A. In these cases, device profiles 242 may include profiles for other devices in the system. As a result, device 116A may include identification data, capability data, and rating data stored in device profiles 242 for these other devices. Device 116A may send requests to any devices in the system for real-time rating information associated with particular candidate devices with which device 116A may wish to interact. Upon receiving this real-time rating information for these candidate devices, device 116A may store the information within the device profiles that correspond to these candidate devices. In addition, device 116A may receive queries from other devices requested real-time rating information associated with certain candidate devices within the system. In these cases, device 116A may access the corresponding rating data (e.g., rating data 250A) that correspond to the identified candidate devices, and provide this rating data back to the requesting device.

As shown in FIG. 2, registry 240 also includes transaction information. Each instance of transaction information 252A-252Q may correspond to details of a particular transaction that has occurred between certain devices in the system and/or with the central authority system. This information may include specific information such as the type of transaction, metadata associated with the transaction, and any identifiers (e.g., machine identifiers) of devices that were involved in the respective transaction. For instance, as shown in FIG. 2, for a first transaction, transaction information 252A includes device identification data 254A and transaction details 256A. Device identification data 254 includes the unique identifiers of any entities (e.g., devices) that participated in the first transaction, and transaction details 256A includes transaction detail information such as the type of transaction and/or other metadata associated with the transaction.

In various examples, transaction information 252 may be one example of transaction information 110 stored in central registry 106 of central authority. Transaction information 252 may be populated and updated based upon information collected and/or provided by the central authority system (e.g., transaction handling unit 105). In various examples, transaction handling unit 105 is capable of monitoring transactions that occur within system 100. In certain cases, transaction handling unit 105 is configured to populate and update transaction information 252 based upon direct involvement of central authority system 102 in certain transactions that occur between devices 116 and/or with central authority system 102. In some cases, transaction handling unit 105 is configured to populate and update transaction information 252 based upon transaction data it receives from one or more of devices 116 (e.g., transaction data provided by one or more of devices 116 based on transactions that occur between these devices). In certain examples, transaction information 252 may be stored in a device's local registry (e.g., local registry 130A or 130N). In these examples, the device storing transaction information 252 may store information for transactions in which the respective device has participated.

Figure 3:
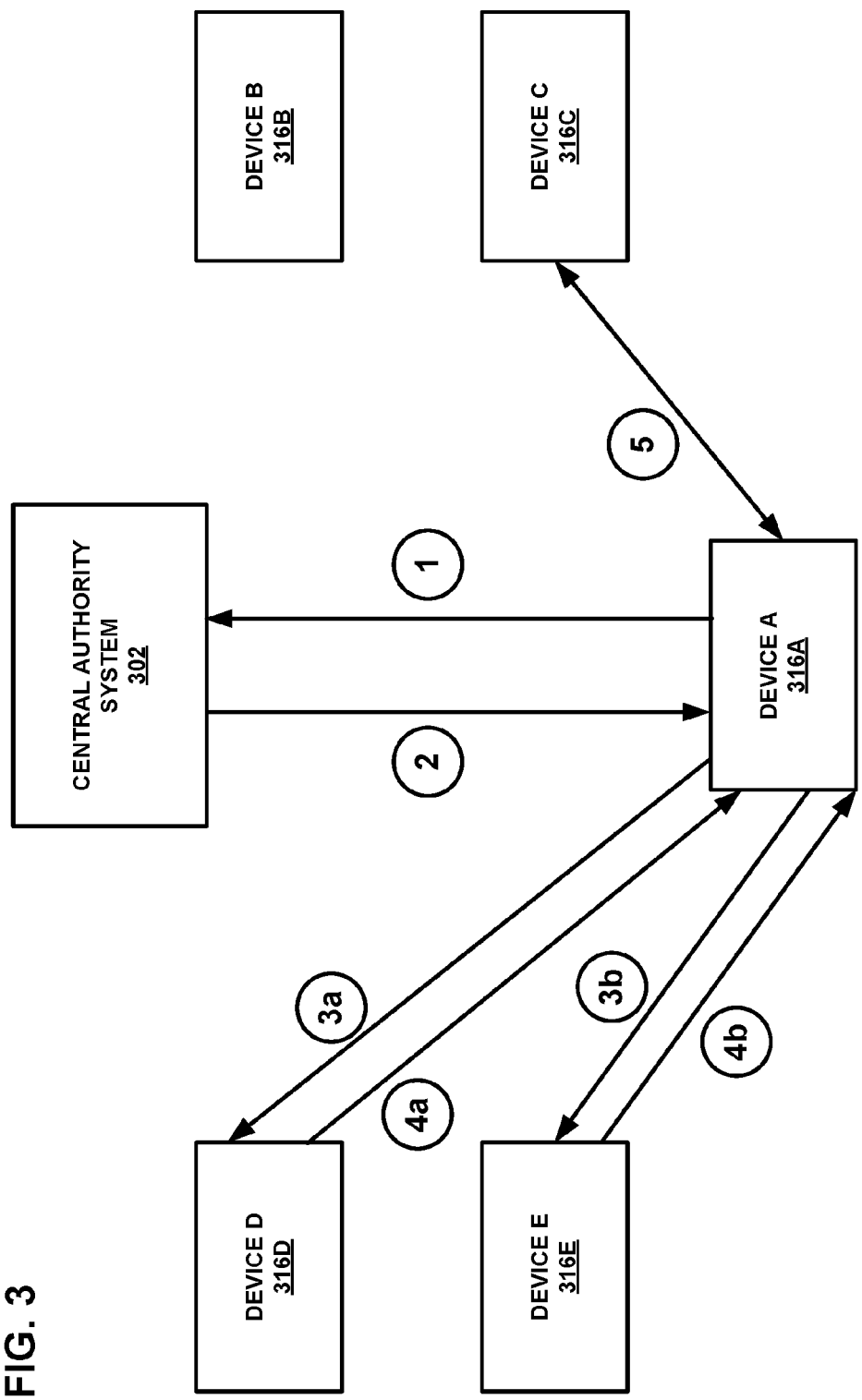
FIG. 3 is a block diagram illustrating example interactions between entities of the distributed device rating system, such as the system shown in FIG. 1, in accordance with techniques of this disclosure.

FIG. 3 is a block diagram illustrating example interactions between entities of a distributed device rating system, such as the system shown in FIG. 1, in accordance with techniques of this disclosure. In the example of FIG. 3, the distributed system includes a central authority system 302 and five devices 316A ("Device A"), 316B ("Device B"), 316C ("Device C"), 316D ("Device D"), and 316E ("Device E"). Central authority system 302 may be one example of central authority system 102 shown in FIG. 1, while devices 316A-316E may be examples of devices 116 shown in FIG. 1.

As an illustrative example with respect to the system shown in FIG. 3, device 316A may be a smart refrigerator that is configured to order replacement groceries autonomously (e.g., without human intervention), such as when certain food items are in short supply or absent within the refrigerator. Device 316A may include various different forms of sensors that are configured to determine presence, levels, and/or quantities of food items included within the refrigerator. Device 316A, upon sensing that milk may need to be reordered, uses central authority system 302 to identify potential suppliers of milk for purchase, as well as other smart refrigerator devices within the system that have recently purchased milk from these potential suppliers.

Initially, device 316A may send (e.g., using transaction query unit 120A) a query to central authority system 302 (ACTION 1 in FIG. 3) to identify other devices within the system that may supply milk, and with which a purchasing transaction may be conducted. This query may specify one or more criteria associated with the desired transaction. For example, the query may specify that certain criteria associated with the type of desired transaction (e.g., purchase of milk), the type of supplier, any cost or timeframe parameters or constraints associated with the purchase or the milk, the type of payment processing for the transaction, and the like.

Upon receiving the query, central authority system 302 may access its central registry (e.g., device profiles 108 and/or transaction information 110 of central registry 106 shown FIG. 1) to identify, based upon the criteria specified in the query, candidate devices within the system. In this example, central authority system 302 may identify candidate devices 316B and 316C, which may be devices associated with vendors that supply milk in accordance with the specified criteria. In addition, central authority system 302 may also utilize information in its central registry to identify reference devices 316D and 316E, which are devices that have previously interacted with one or more of devices 316B or 316C. Because transaction information 110 includes transaction details and device identifiers of any devices involved in particular transactions, central authority system 302 is capable of obtaining the identifiers of devices that have previously interacted with devices 316B and 316C in one or more transactions (e.g., the same or similar types of transactions within which requesting device 116A wants to perform). For instance, devices 316D and 316E may have previously engaged in transactions to purchase milk from suppliers associated with devices 316B and 316C. Central authority system 302 may provide the device identifiers of candidate devices 316B and 316C, along with the device identifiers of reference devices 316D and 316E, back to device 316A in response to its query. Device 316A receives this information from central authority system 302 (ACTION 2 in FIG. 3).

Device 316A may determine which of devices 316B or 316C it will engage with in a transaction to purchase milk based on real-time rating information from reference devices 316D and 316E. By querying devices 316D and 316E, device 316A may obtain respective portions of real-time rating information for candidate devices 316B and 316C that is recent and relevant to the current desired transaction, and device 316A may also specify certain characteristics of the services that it desires in the transaction, such that devices 316D and 316E may provide rating information that includes data associated with these characteristics (e.g., characteristics related to timeliness, price, quality). To do so, device 316A may utilize the device identifiers received from central authority system 302 for devices 316D and 316E (e.g., IP addresses) to send queries to these devices in order to request real-time rating information for candidate devices 316B and 316C, where the real-time rating information includes desired or pertinent characteristics of the services to be performed, as specified by device 316A.

Device 316A may send (e.g., using rating query unit 128A) a first query to device 316D (ACTION 3a in FIG. 3) to request any such real-time rating information that device 316D may have regarding prior transactions with device 316B and/or 316C. Similarly, device 316A may send a second query to device 316E (ACTION 3b in FIG. 3) to request any real-time rating information it has regarding prior transaction with devices 316B and/or 316C.

Based on the specified characteristics provided by device 316A, devices 316D and 316E may provide respective portions of real-time rating information for devices 316B and 316C to device 316A. For instance, if device 316D had previously purchased milk from devices 316B and 316C at different points in time, device 316D may access its local registry to identify and send rating information for devices 316B and 316C (e.g., one or more portions of rating information) based on its prior transactions, where the rating information may identify characteristics associated with, e.g., timeliness, price, and/or quality, if these were characteristics requested or specified in the query received from device 316A. If device 316E had previously purchased milk from devices 316B and 316C at different points in time, device 316E may access its local registry to identify and send rating information for devices 316B and 316C

(e.g., one or more additional portions of rating information) based on its prior transactions, where the rating information may identify characteristics associated with, e.g., timeliness, price, and/or quality.

Upon receiving these portions of real-time rating information from each of devices 316D (ACTION 4a in FIG. 3) and 316E (ACTION 4b in FIG. 3), device 316A may (e.g., using selection unit 122A and/or rating analysis unit 124A) use the received portions of real-time performance information to select one of these devices to initiate performance of the desired transaction (e.g., a transaction to purchase milk using transaction unit 118A). For example, selection unit 122A may determine whether the rating information associated with the candidate devices satisfies a respective rating threshold, such as a predefined or dynamically determined threshold that is based on one or more factors (e.g., factors focused on the cost/quality/timeliness of the service performed or on the trustworthiness of candidate devices 316B and/or 316C). In some cases, the respective rating threshold associated with any given device may comprise a weighted threshold that is based on multiple different factors, where each factor has a particular weighted contribution to the overall weighted threshold.

Selection unit 122A may select the candidate device based on a respective composite rating that is calculated for each of candidate devices 316B and 316C. For instance, rating analysis unit 124A may calculate a composite (e.g., mean average) rating for candidate device 316B based upon the individual ratings (e.g., respective portions of rating information) that were received from each of reference devices 316D and 316E. Similarly, rating query unit 128A may calculate a composite rating for candidate device 316C based upon the individual ratings that were received from each of reference devices 316D and 316E.

Rating analysis unit 124A may then select the candidate device having the highest overall composite rating that satisfies a respective rating threshold. If, for instance, device 316C has the highest overall composite rating that satisfies the defined rating threshold, rating analysis unit 124A may select device 316C. Transaction unit 118A of device 316A may then initiate a transaction with the selected device 316C to purchase milk (ACTION 5 in FIG. 3).

In other examples, the requesting device (e.g., device 316A) may gather a relatively large number of real-time ratings for a relatively large number of candidate devices with which to perform the transaction. In these examples, the requesting device may include a machine learning engine. For example, as shown in FIG. 1, device 116A may include a machine learning engine 126A that comprises an artificial intelligence (AI) or deep learning engine capable of analyzing a large number of real-time ratings for candidate devices to select the optimum candidate device for device 116A to use when performing the transaction.

Figure 4:
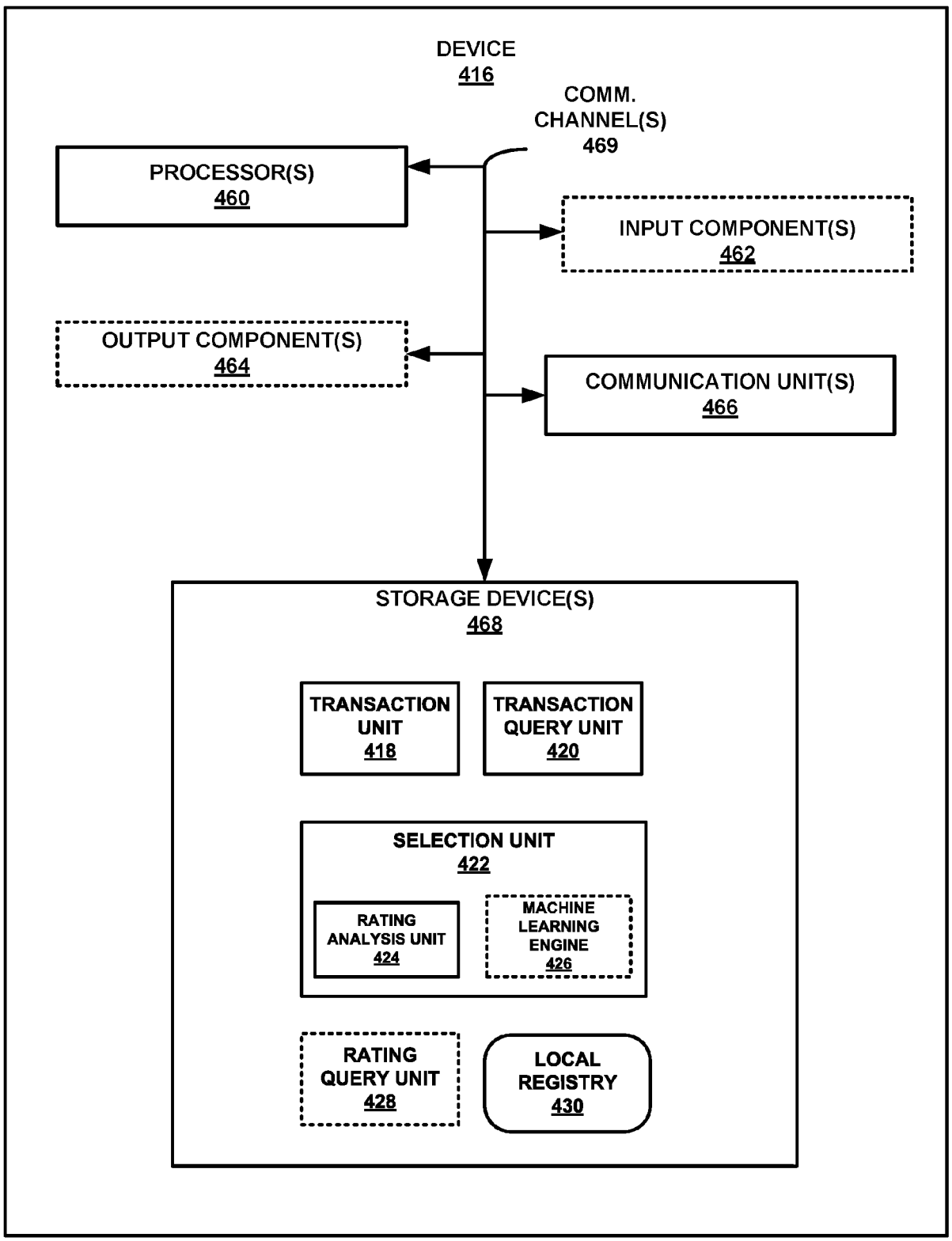
FIG. 4 is a block diagram illustrating further example details of one or more of the devices shown in FIG. 1, in accordance with techniques of this disclosure.

FIG. 4 is a block diagram illustrating further example details of one or more of the devices shown in FIG. 1, in accordance with techniques of this disclosure. Device 416 shown in FIG. 4 may be one example of any of the devices 112 and/or 116 shown in FIG. 1. Device 416 may be implemented as any suitable computing device, machine, or system, such as one or more server computers, workstations, mainframes, appliances, cloud computing systems, and/or other computing systems that may be capable of performing operations and/or functions described in accordance with one or more aspects of the present disclosure. In some examples, device 416 may comprise one or more physical entities, while in other examples, device 416 may comprise one or more virtual entities (e.g., virtual machines). FIG. 4 illustrates only one particular example of device 416, and many other examples of device 416 may be used in other instances and may include a subset of the components included in example device 416 or may include additional components not shown in FIG. 4.

As shown in the example of FIG. 4, device 416 includes one or more processors 460, one or more optional input components 462, one or more communication units 466, one or more optional output components 464, and one or more storage devices 468. Communication channels 469 may interconnect each of the components 460, 462, 464, 466, and 468 for inter-component communications (physically, communicatively, and/or operatively). In some examples, communication channels 469 may include a system bus, a network connection, an inter-process communication data structure, or any other method for communicating data between hardware and/or software.

One or more input components 462 of device 416 may receive input. Examples of input are tactile, audio, and video input. Examples of input components 462 include a presence-sensitive screen, touch-sensitive screen, mouse, keyboard, voice responsive system, video camera, microphone or any other type of device for detecting input from a human or machine.

One or more output components 464 of device 416 may generate output. Examples of output are tactile, audio, and video output. Examples of output components 464 include a presence-sensitive screen, sound card, video graphics adapter card, speaker, cathode ray tube (CRT) monitor, liquid crystal display (LCD), or any other type of device for generating output to a human or machine. Output components 464 may include display devices such as cathode ray tube (CRT) monitor, liquid crystal display (LCD), or any other type of device for generating tactile, audio, and/or visual output.

One or more communication units 466 of device 416 may communicate with one or more other devices via one or more networks by transmitting and/or receiving network signals on the one or more networks. Examples of communication units 466 include a network interface card (e.g. such as an Ethernet card), an optical transceiver, a radio frequency transceiver, or any other type of device that can send and/or receive information, such as through a wired or wireless network. Other examples of communication units 466 may include short wave radios, cellular data radios, wireless Ethernet network radios, as well as universal serial bus (USB) controllers.

One or more storage devices 468 within device 416 may store information for processing during operation of device 416 (e.g., device 416 may store data accessed by one or more modules, processes, applications, or the like during execution at device 416). In some examples, storage devices 468 on device 416 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 468 may include redundant array of independent disks (RAID) configurations and one or more solid-state drives (SSD's).

Storage devices 468, in some examples, also include one or more computer-readable storage media. Storage devices 468 may be configured to store larger amounts of information than volatile memory. Storage devices 468 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 468 may store program instructions and/or data associated with one or more software/firmware elements or modules.

For example, when device 416 comprises an example of one of devices 116 shown in FIG. 1, such as device 116A, storage devices 468 may store instructions and/or data associated with a transaction unit 418, a transaction query unit 420, a selection unit 422 (including a rating analysis unit 424 and an optional machine learning engine 426), an optional rating query unit 428, and a local registry 430. These may be examples of similarly named components shown in FIG. 1.

Device 416 further includes one or more processors 460 that may implement functionality and/or execute instructions within device 416. For example, processors 460 may receive and execute instructions stored by storage devices 468 that execute the functionality of the elements and/or modules described herein. These instructions executed by processors 460 may cause device 416 to store information within storage devices 468 during program execution. Processors 460 may also execute instructions of the operating system to perform one or more operations described herein.

Figure 5:
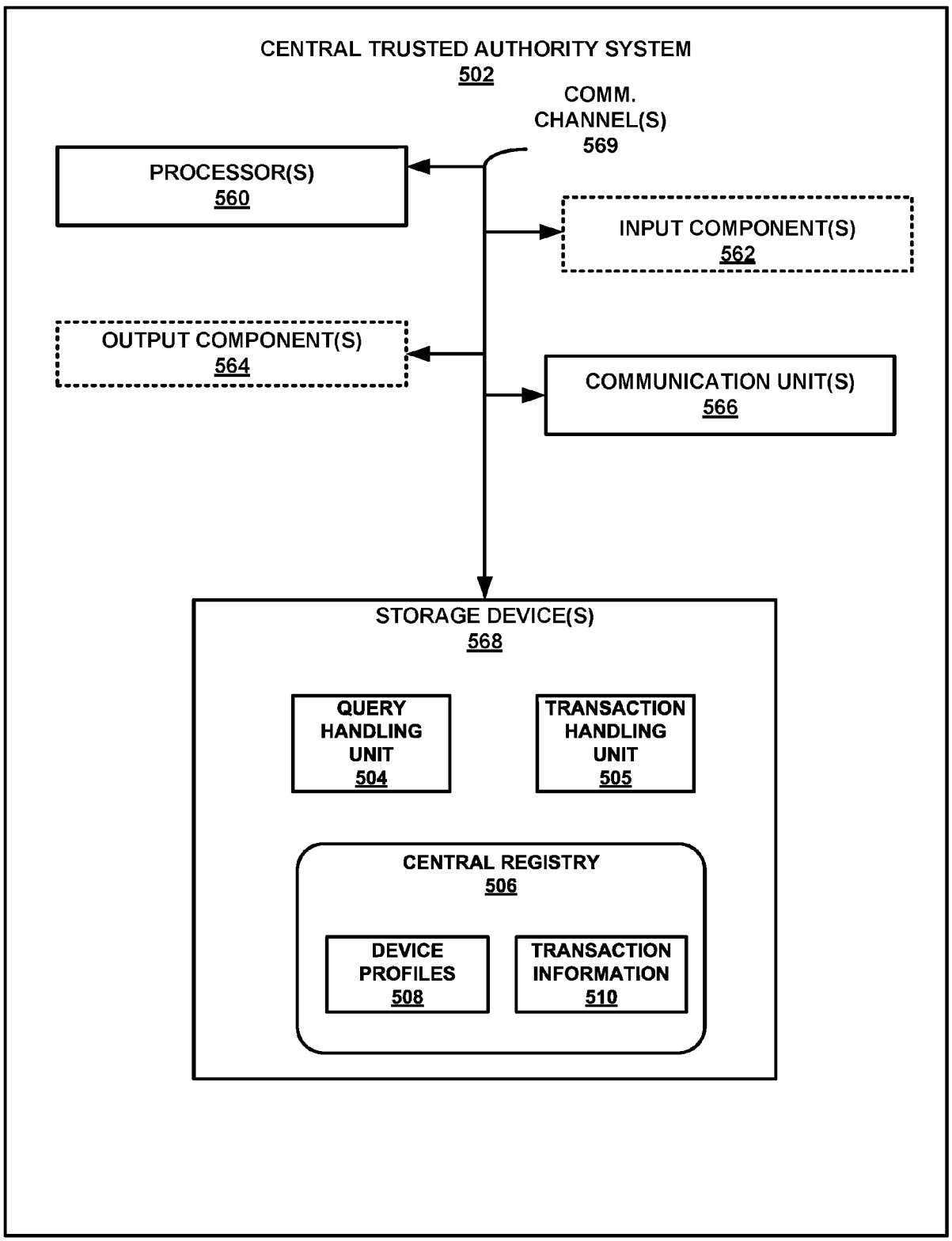
FIG. 5 is a block diagram illustrating further example details of the central trusted authority system shown in FIG. 1, in accordance with techniques of this disclosure.

FIG. 5 is a block diagram illustrating further example details of the central trusted authority system shown in FIG. 1, in accordance with techniques of this disclosure. Central trusted authority system 502 shown in FIG. 5 may be one example of central trusted authority system 102 shown in FIG. 1. System 502 may be implemented as any suitable computing device, machine, or system, such as one or more server computers, workstations, mainframes, appliances, cloud computing systems, and/or other computing systems that may be capable of performing operations and/ or functions described in accordance with one or more aspects of the present disclosure. In some examples, system 502 may represent a cloud computing system, server farm, and/or server cluster (or portion thereof) that provides services to other devices or systems. In other examples, system 502 may represent or be implemented through one or more virtualized compute instances (e.g., virtual machines, containers) of a data center, cloud computing system, server farm, and/or server cluster. FIG. 5 illustrates only one particular example of system 502, and many other examples of system 502 may be used in other instances and may include a subset of, or additional components not shown, in FIG. 5.

As shown in the example of FIG. 5, system 502 includes one or more processors 560, one or more optional input components 562, one or more communication units 566, one or more optional output components 564, and one or more storage devices 568. Communication channels 569 may interconnect each of the components 560, 562, 564, 566, and 568 for inter-component communications (physically, communicatively, and/or operatively). In some examples, communication channels 569 may include a system bus, a network connection, an inter-process communication data structure, or any other method for communicating data between hardware and/or software.

One or more input components 562 of system 502 may receive input. Examples of input are tactile, audio, and video input. Examples of input components 562 include a presence-sensitive screen, touch-sensitive screen, mouse, keyboard, voice responsive system, video camera, microphone or any other type of device for detecting input from a human or machine.

One or more output components 564 of system 502 may generate output. Examples of output are tactile, audio, and video output. Examples of output components 564 include a presence-sensitive screen, sound card, video graphics adapter card, speaker, cathode ray tube (CRT) monitor, liquid crystal display (LCD), or any other type of device for generating output to a human or machine. Output components 564 may include display devices such as cathode ray tube (CRT) monitor, liquid crystal display (LCD), or any other type of device for generating tactile, audio, and/or visual output.

One or more communication units 566 of system 502 may communicate with one or more other devices via one or more networks by transmitting and/or receiving network signals on the one or more networks. Examples of communication units 566 include a network interface card (e.g. such as an Ethernet card), an optical transceiver, a radio frequency transceiver, or any other type of device that can send and/or receive information, such as through a wired or wireless network. Other examples of communication units 566 may include short wave radios, cellular data radios, wireless Ethernet network radios, as well as universal serial bus (USB) controllers.

One or more storage devices 568 within system 502 may store information for processing during operation of system 502 (e.g., system 502 may store data accessed by one or more modules, processes, applications, or the like during execution at system 502). In some examples, storage devices 568 on system 502 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 568 may include redundant array of independent disks (RAID) configurations and one or more solid-state drives (SSD's).

Storage devices 568, in some examples, also include one or more computer-readable storage media. Storage devices 568 may be configured to store larger amounts of information than volatile memory. Storage devices 568 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 568 may store program instructions and/or data associated with one or more software/firmware elements or modules.

For example, when system 502 comprises an example of one of central authority system 102 shown in FIG. 1, storage devices 568 may store instructions and/or data associated with a query handling unit 504, a transaction handling unit 505, and a central registry 506 (which includes device profiles 508 and transaction information 510). These may be examples of similarly named components shown in FIG. 1.

System 502 further includes one or more processors 560 that may implement functionality and/or execute instructions within system 502. For example, processors 560 may receive and execute instructions stored by storage devices 568 that execute the functionality of the elements and/or modules described herein. These instructions executed by processors 560 may cause system 502 to store information within storage devices 568 during program execution. Processors 460 may also execute instructions of the operating system to perform one or more operations described herein.

FIG. 6 is a flow diagram illustrating example operations to provide rating information associated with one or more devices in a distributed machine rating system, in accordance with techniques of this disclosure. As indicated in the example of FIG. 6, example process 600 includes operations 602, 604, 606, 608, and 610. In various examples, any of devices 116 shown in FIG. 1 may perform process 600. For purposes of illustration only, in the description of FIG. 6 below, it will be assumed that device 116A performs the recited operations while interacting with central authority system 102 and other devices 116 in system 100.

Device 116A may send (602), to central authority system 102, a query to identify at least one other device with which to perform a transaction. This query may specify one or more criteria associated with the transaction. Responsive to sending the query, device 116A may receive (604), from central authority system 102, an identification of one or more candidate devices (e.g., candidate devices from devices 116) with which to perform the transaction.

Device 116A may receive (606) rating information (e.g., real-time rating information) associated with the one or more candidate devices, such as from one or more other devices 116 in system 100 and/or from central authority system 102. The rating information identifies at least one characteristic of services previously performed by the one or more candidate devices. Device 116A may determine (608) whether the rating information associated with at least one candidate device of the one or more candidate devices satisfies a rating threshold. Responsive to determining that the rating information associated with the at least one candidate device of the one or more candidate devices does satisfy the rating threshold, device 116A may initiate (610), with the at least one candidate device, performance of the transaction. In various examples, device 116A is configured to autonomously, and without user intervention, send the query to central authority system 102, receive the identification of the one or more candidate devices, receive the rating information associated with the one or more candidate devices, determine that the rating information associated with the at least one candidate device satisfies the threshold, and initiate performance of the transaction.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
sending, by a device and to a central authority system, a query to identify at least one other device with which to perform a transaction, wherein the query specifies one or more criteria associated with the transaction;
responsive to sending the query, receiving, by the device and from the central authority system, an identification of one or more candidate devices with which to perform the transaction and an identification of one or more reference devices that have recently performed at least one financial transaction with the one or more candidate devices;
sending, by the device and to the one or more reference devices, one or more reference queries, wherein the one or more reference queries specify the identification of the one or more candidate devices, and wherein the one or more reference queries further specify at least one characteristic of services previously performed by the one or more candidate devices, and wherein the at least one characteristic of services previously performed includes timeliness of delivery;

responsive to sending the one or more reference queries, receiving, by the device and from the one or more reference devices, rating information associated with the one or more candidate devices, wherein the rating information identifies the at least one characteristic of services previously performed by the one or more candidate devices, and includes rating information about timeliness of delivery of a physical product provided in connection with the services;

determining, by the device, whether the rating information associated with at least one candidate device of the one or more candidate devices satisfies a rating threshold; and responsive to determining that the rating information associated with the at least one candidate device of the one or more candidate devices satisfies the rating threshold, initiating, by the device and with the at least one candidate device, performance of the transaction.

2. The method of claim 1, wherein receiving the rating information associated with the one or more candidate devices comprises receiving real-time rating information from the central authority system.

3. The method of claim 1,
wherein the one or more reference devices comprise at least a first reference device and a second reference device,
wherein sending the one or more reference queries comprises:
sending, by the device and to the first reference device, a first reference query to obtain a first portion of the rating information associated with the one or more candidate devices; and
sending, by the device and to the second reference device, a second reference query to obtain a second portion of the rating information associated with the one or more candidate devices, and
wherein receiving the rating information associated with the one or more candidate devices comprises:
receiving, by the device and from the first reference device, the first portion of the rating information associated with the one or more candidate devices; and
receiving, by the device and from the second reference device, the second portion of the rating information associated with the one or more candidate devices.

4. The method of claim 3, wherein determining whether the rating information associated with the at least one candidate device of the one or more candidate devices satisfies the rating threshold comprises:
calculating, by the device and based on the first and second portions of the rating information, a respective composite score associated with each of the one or more candidate devices; and
determining, by the device, whether the respective composite score associated with the at least one candidate device satisfies the rating threshold.

5. The method of claim 1,
wherein receiving the identification of the one or more candidate devices with which to perform the transaction comprises receiving, by the device and from the central authority system, at least a first identifier of a first candidate device and a second identifier of a second candidate device, and
wherein receiving the rating information associated with the one or more candidate devices comprises:
receiving, by the device, first rating information associated with the first candidate device; and receiving, by the device, second rating information associated with the second candidate device.

6. The method of claim 5, wherein determining whether the rating information associated with the at least one candidate device of the one or more candidate devices satisfies the rating threshold comprises:
calculating, by the device and based on the first rating information, a first composite score associated with the first candidate device;
calculating, by the device and based on the second rating information, a second composite score associated with the second candidate device;
determining, by the device, whether the first composite score satisfies a first rating threshold associated with the first candidate device; and
determining, by the device, whether the second composite score satisfies a second rating threshold associated with the second candidate device.

7. The method of claim 6, wherein initiating performance of the transaction comprises one of:
responsive to determining that the first composite score satisfies the first rating threshold associated with the first candidate device, and also that the first composite score exceeds the second composite score, initiating, by the device, performance of the transaction with the first candidate device; or
responsive to determining that the second composite score satisfies the second rating threshold associated with the second candidate device, and also that the second composite score exceeds the first composite score, initiating, by the device, performance of the transaction with the second candidate device.

8. The method of claim 1, wherein the one or more criteria specified by the query includes one or more of a criterion associated with a type of requested services, a criterion associated with capabilities to perform the requested services, a criterion associated with a cost or timing of the requested services, a criterion associated with a quality of the requested services, a criterion associated with trustworthiness of a candidate device, or a criterion associated with use of a particular operating system or communication protocol by a candidate device.

9. The method of claim 1, wherein the at least one characteristic of services identified by the rating information includes one or more of a type of services previously performed by the one or more candidate devices, capabilities of the one or more candidate devices to perform requested services, cost or timing characteristics associated with services previously performed by the one or more candidate devices, operating systems or communication protocols used by the one or more candidate devices, a quality of services provided by the one or more candidate devices, or a trustworthiness of the one or more candidate devices.

10. The method of claim 1, wherein determining whether the rating information associated with the at least one candidate device of the one or more candidate devices satisfies the rating threshold comprises determining, by the device, whether the at least one characteristic of services previously performed by the one or more candidate devices satisfies at least one criterion of the rating threshold.

11. The method of claim 1, wherein the identification of the one or more candidate devices with which to perform the transaction comprises an identification of a device chain that includes a group of candidate devices.

12. The method of claim 1, wherein the device autonomously, and without user intervention, performs one or more of sending the query, receiving the identification of the one or more candidate devices, receiving the rating information associated with the one or more candidate devices, determining whether the rating information associated with the at least one candidate device satisfies the rating threshold, or initiating performance of the transaction.

13. The method of claim 1, wherein the device and the one or more candidate devices each comprises one of a physical device or a virtual device.

14. A device comprising:
one or more processors; and
at least one computer-readable storage device storing instructions that are executable by the one or more processors to:
send, to a central authority system, a query to identify at least one other device with which to perform a transaction, wherein the query specifies one or more criteria associated with the transaction;
responsive to sending the query, receive, from the central authority system, an identification of one or more candidate devices with which to perform the transaction and an identification of one or more reference devices that have recently performed at least one financial transaction with the one or more candidate devices;
send, to the one or more reference devices, one or more reference queries to obtain rating information associated with the one or more candidate devices, wherein the one or more reference queries specify the identification of the one or more candidate devices, and wherein the one or more reference queries further specify at least one characteristic of services previously performed by the one or more candidate devices, and wherein the at least one characteristic of services performed includes timeliness of delivery;
responsive to sending the one or more reference queries, receive from the one or more references devices, rating information associated with the one or more candidate devices, wherein the rating information identifies the at least one characteristic of services previously performed by the one or more candidate devices, and includes rating information about timeliness of delivery of a physical product provided in connection with the services;
determine whether the rating information associated with at least one candidate device of the one or more candidate devices satisfies a rating threshold; and
responsive to determining that the rating information associated with the at least one candidate device of the one or more candidate devices satisfies the rating threshold, initiate, with the at least one candidate device, performance of the transaction.

15. The device of claim 14, wherein the instructions stored by the at least one computer-readable storage device that are executable to receive the rating information associated with the one or more candidate devices are further executable to receive real-time rating information from the central authority system.

16. The device of claim 14,
wherein the one or more reference devices comprise at least a first reference device and a second reference device,
wherein the instructions stored by the at least one computer-readable storage device that are executable to send the one or more reference queries are further executable to:
send, to the first reference device, a first reference query to obtain a first portion of the rating information associated with the one or more candidate devices; and
send, to the second reference device, a second reference query to obtain a second portion of the rating information associated with the one or more candidate devices, and
wherein the instructions stored by the at least one computer-readable storage device that are executable to receive the rating information associated with the one or more candidate devices are further executable to:
receive, from the first reference device, the first portion of the rating information associated with the one or more candidate devices; and
receive, from the second reference device, the second portion of the rating information associated with the one or more candidate devices.

17. The device of claim 16, wherein the instructions stored by the at least one computer-readable storage device that are executable to determine whether the rating information associated with the at least one candidate device of the one or more candidate devices satisfies the rating threshold are further executable to:
calculate, based on the first and second portions of the rating information, a respective composite score associated with each of the one or more candidate devices; and
determine whether the respective composite score associated with the at least one candidate device satisfies the rating threshold.

18. The device of claim 14,
wherein the instructions stored by the at least one computer-readable storage device that are executable to receive the identification of the one or more candidate devices with which to perform the transaction are further executable to receive, from the central authority system, at least a first identifier of a first candidate device and a second identifier of a second candidate device, and
wherein the instructions stored by the at least one computer-readable storage device that are executable to receive the rating information associated with the one or more candidate devices are further executable to:
receive first rating information associated with the first candidate device; and
receive second rating information associated with the second candidate device.

19. A system comprising:
a central authority system comprising first one or more processors and at least one first computer-readable storage device storing first instructions; and
a device comprising second one or more processors and at least one second computer-readable storage device storing second instructions,
wherein the first instructions stored by the at least one first computer-readable storage device are executable by the first one or more processors of the central authority system to:
receive, from the device, a query to identify at least one other device with which to perform a transaction, wherein the query specifies one or more criteria associated with the transaction; and
responsive to receiving the query, send, to the device, an identification of one or more candidate devices with which to perform the transaction and an identification of one or more reference devices that have recently performed at least one financial transaction with the one or more candidate devices, and
wherein the second instructions stored by the at least one second computer-readable storage device are executable by the second one or more processors of the device to:
responsive to sending the query to the central authority system, receive, from the central authority system, the identification of the one or more candidate devices and the identification of one or more reference devices that have previously performed the at least one transaction with the one or more candidate devices;

send, to the one or more reference devices, one or more reference queries to obtain rating information associated with the one or more candidate devices, wherein the one or more reference queries specify the identification of the one or more candidate devices, and wherein the one or more reference queries further specify at least one characteristic of services previously performed by the one or more candidate devices, and wherein the at least one characteristic of services performed includes timeliness of delivery;

responsive to sending the one or more reference queries, receive rating information associated with the one or more candidate devices, wherein the rating information identifies the at least one characteristic of services previously performed by the one or more candidate devices, and includes rating information about timeliness of delivery of a physical product provided in connection with the services;

determine whether the rating information associated with at least one candidate device of the one or more candidate devices satisfies a rating threshold; and responsive to determining that the rating information associated with the at least one candidate device of the one or more candidate devices satisfies the rating threshold, initiate, with the at least one candidate device, performance of the transaction.

* * * * *